United States Patent [19]

Spielmann

[11] 4,423,597
[45] Jan. 3, 1984

[54] HYDRAULIC BRAKE ASSEMBLY WITH PNEUMATIC POWER ASSIST

[75] Inventor: Norbert Spielmann, Ebern, Fed. Rep. of Germany

[73] Assignee: Fag Kugelfischer Georg Schäfer & Co., Schweinfurt, Fed. Rep. of Germany

[21] Appl. No.: 237,674

[22] Filed: Feb. 24, 1981

[30] Foreign Application Priority Data

Feb. 26, 1980 [DE] Fed. Rep. of Germany ....... 3007148

[51] Int. Cl.³ .............................................. B60T 13/00
[52] U.S. Cl. .................................... 60/547.1; 60/562; 60/553; 60/552; 92/107; 91/369 R; 91/369 B
[58] Field of Search .................... 60/547 R, 551, 553, 60/552; 92/107; 91/369 R, 369 B

[56] References Cited

U.S. PATENT DOCUMENTS

| 2,900,962 | 8/1959 | Ingres ................................ 60/547 R |
| 2,929,215 | 3/1960 | Stelzer ............................... 60/547 R |
| 2,929,216 | 3/1960 | Stelzer ............................... 60/553 |
| 2,957,454 | 10/1960 | Stelzer ............................... 60/551 |
| 3,321,918 | 5/1967 | Tennrswood ..................... 60/547 R |
| 3,408,815 | 11/1968 | Stelzer ............................... 60/551 |
| 3,564,849 | 2/1971 | Huruta ................................ 60/562 |

FOREIGN PATENT DOCUMENTS

| 1910600 | 9/1970 | Fed. Rep. of Germany .... 60/547 R |
| 2845794 | 4/1979 | Fed. Rep. of Germany . |
| 2814372 | 10/1979 | Fed. Rep. of Germany . |
| 2814419 | 10/1979 | Fed. Rep. of Germany . |
| 44-22133 | 9/1969 | Japan ............................... 60/547 R |

OTHER PUBLICATIONS

Bremsen-Handbuch, Bartsch Verlag, Fifth Edition, p. 75.

*Primary Examiner*—Abraham Hershkovitz
*Attorney, Agent, or Firm*—Karl F. Ross; Herbert Dubno

[57] ABSTRACT

A hydraulic brake assembly with pneumatic power assist has a master cylinder inserted in a housing in turn at least partially surrounded by an annular power-booster device comprising a pair of annular chambers divided by a membrane. The membrane is connected via a plate and a sleeve or tie rods to a tension rod axially traversing a substantial portion of the master cylinder. The tension rod engages an actuator piston placed in compression by a push rod upon the actuation of a brake pedal linked thereto. The force for actuating a fluid-compression piston in the master cylinder is thus transmitted thereto partly via tension-stressed elements and partly via compression-stressed elements. Force feedback to the brake pedal is implemented either hydraulically via fluid-flow channels in the tension rod or mechanically via a lever inside or outside the housing. A fluid reservoir is removably mounted on the housing in juxtaposition to the booster chambers and transversely to the housing axis.

16 Claims, 9 Drawing Figures

HYDRAULIC BRAKE ASSEMBLY WITH PNEUMATIC POWER ASSIST

FIELD OF THE INVENTION

My present invention relates to a power-assisted master brake cylinder assembly for use in automotive vehicles. More particularly, my present invention relates to a hydraulic brake cylinder assembly with a pneumatic power booster.

BACKGROUND OF THE INVENTION

As described in the booklet "Brake Handbook" ("Bremsen-Handbuch"), page 75 of the fifth edition, published by Bartsch Verlag, a brake energizer or power booster comprises a membrane dividing a chamber into a pair of compartments, a first compartment being connected to the intake manifold of the engine of an automotive vehicle and the second compartment being alternately connectable to the first compartment and to the atmosphere, depending on the operational status of a valve actuated by a push rod linked to the brake pedal of the vehicle. Generally, during energization of the vehicle's engine, a vacuum exists in both compartments of the power booster. Upon actuation of the brake, however, the valve closes the air-flow path between the compartments and opens the second compartment to the atmosphere. The resulting pressurization of the second compartment shifts the membrane to increase the volume of the second compartment, this shift being accomplished against the action of a biasing spring inside the first compartment. A plate is connected to the membrane and to a mechanical force-transmission component in turn linked to a master brake cylinder at one end and to the push-rod actuator at an opposite end, the pressurization of the second chamber creating a force transmitted over the plate to the master cylinder to aid the push rod in the activation of the hydraulic brake system of the vehicle.

A disadvantage of known power-assisted brake systems of the above-described type is the great length of the entire assembly; the air-flow control valves, the power booster and the master brake cylinder are aligned to one another in an axial array. Furthermore, because the forces actuating the master brake cylinder must be transmitted over the power booster, the same must be formed with thick, heavy walls to withstand the high stresses.

From the German open patent application (Offenlegungsschrift) No. 2,845,794 the transmission of forces by means of tie rods is known to take the stresses off the power booster. However, the axial length of the brake assembly is nevertheless very great. Disclosures made in German open patent applications Nos. 2,814,372 and 2,814,419 do not address this problem.

Another disadvantage of conventional power-assisted brake assemblies is that the force-transmission member actuating the master cylinder must be massive in order to withstand substantial bending forces.

OBJECTS OF THE INVENTION

An object of my present invention is to provide an improved power-assisted brake assembly of the above-described type which has a shortened axial length.

Another object of my present invention is to provide such an assembly wherein the forces transmitted over the power booster are reduced.

Yet another object of my present invention is to provide such an assembly wherein the bending stresses on the force-transmission members are reduced.

SUMMARY OF THE INVENTION

A hydraulic brake assembly with pneumatic power assist for use in a motor vehicle comprises, according to my present invention, a substantially cylindrical housing, a master brake cylinder rigid with and surrounded by the housing and a power-booster device operatively connected to the master cylinder and to the intake manifold of the engine of the vehicle for assisting, with suction power supplied by the intake manifold, in the operation of the master cylinder by a push rod linked at one end to a brake pedal of the vehicle and at an opposite end to the master cylinder. The master cylinder and the housing are at least partially surrounded by the power-booster device.

A reservoir or tank is attached to the housing for storing brake fluid used to charge the master cylinder, a hydraulic circuit extending from the reservoir to the master cylinder and therefrom to brake cylinders at the wheels of the vehicle for guiding brake fluid during the operation of the brake assembly. An air-flow control valve mounted in a casing rigid with the housing is operatively connected to the push rod and the power-booster device for controlling the operation thereof at least partially in response to axial motion of the rod. A second valve also responsive to the axial motion of the push rod is disposed in the hydraulic circuit for closing a circuit path between the reservoir and the master cylinder and for opening another path between the same and the brake cylinders at the wheels upon an inward axial shift of the push rod.

According to another feature of my present invention the power-booster device includes a pair of annular chambers separated by a membrane and concentrically surrounding the housing and the master cylinder, the push rod being journaled in the valve casing which is attached to an end of the housing. The master cylinder includes at an extremity proximate to the casing an actuator piston operatively connected at an outer end to the push rod and at an inner end to a tension rod axially traversing a substantial portion of the master cylinder. This tension rod is linked to the power-booster device for transmitting a tensile force to the piston to aid the push rod in the actuation of the master cylinder.

According to another feature of my present invention, the master cylinder includes at least one brake-fluid chamber defined in part by a fluid-compression piston disposed between the actuator piston and an end of the master cylinder opposite the valve casing. The brake-fluid chamber communicates with the hydraulic circuit, while feedback means operatively engage the push rod for transmitting force back to the brake pedal upon operation of the master cylinder.

According to one of two alternative features of my present invention, the push rod engages or is linked to a compression member which is slidably mounted in the actuator piston, the feedback means including a conduit extending in the tension rod from the brake-fluid chamber in the master cylinder to an additional chamber defined in part by a recess disposed in the compression member at an end thereof opposite the push rod. If the master cylinder includes a plurality of brake-fluid chambers disposed in an axial array and defined in part by respective pistons, the conduit in the tension rod communicates with each brake-fluid chamber and with the additional chamber.

According to the other alternative feature of my present invention, the feedback means includes a mechanical force transmitter preferably in the form of a lever engaging the tension rod. The mechanical transmitter may be disposed in the housing or outside the housing at the end thereof opposite the valve casing; in the latter case a compression or push rod extends from the lever axially through the master cylinder for engaging an inner end of an actuator member which in turn engages at its outer end the push rod from the brake pedal.

Pursuant to another feature of my present invention, the storage tank is juxtaposed to the annular power-booster chambers and oriented transversely to the housing. Preferably, the tank is removably attached to the housing.

Pursuant to yet another feature of my present invention, the housing is formed with a plurality of axially extending elongate conduits or cells, the hydraulic circuit including a plurality of these cells and the power-booster device being connected to the air-flow control valve by at least one of the housing cells. The housing may be formed from a plurality of separate parts, one or more of which may be made from synthetic resin.

The air-flow control valve advantageously includes an annular valve member carried with the push rod and slidably engaging an inner surface of the valve casing, while the power-booster device is connected to the tension rod preferably by a sleeve surrounding an end of the housing opposite the valve casing.

A distinguishing characteristic of a brake assembly according to my present invention is its lightness. Because the power-booster device surrounds the housing rather than being inserted between the valve casing and the master cylinder, the superstructure of the booster is not subjected to large stresses and consequently does not need to be heavily dimensioned. Because the assist power from the booster is transmitted to the master cylinder via a tension rod, the actuator piston carries a reduced load over at least a substantial portion of its length. The actuator piston and the compression or force-transmission member inserted therein experience smaller bending stresses than in conventional power-assisted brake assemblies and, therefore, may be made of lighter-weight materials or may be thinner in their transverse dimensions. In addition, the cellular structure of the housing enables the utilization of lightweight substances such as synthetic resins by distributing stresses in an optimally efficient way.

Another advantage of a brake assembly according to my present invention is its relatively short length.

BRIEF DESCRIPTION OF THE DRAWING

These and other features of my present invention will now be described in detail, reference being made to the accompanying drawings in which.

SPECIFIC DESCRIPTION

Figures 1, 2, 3:
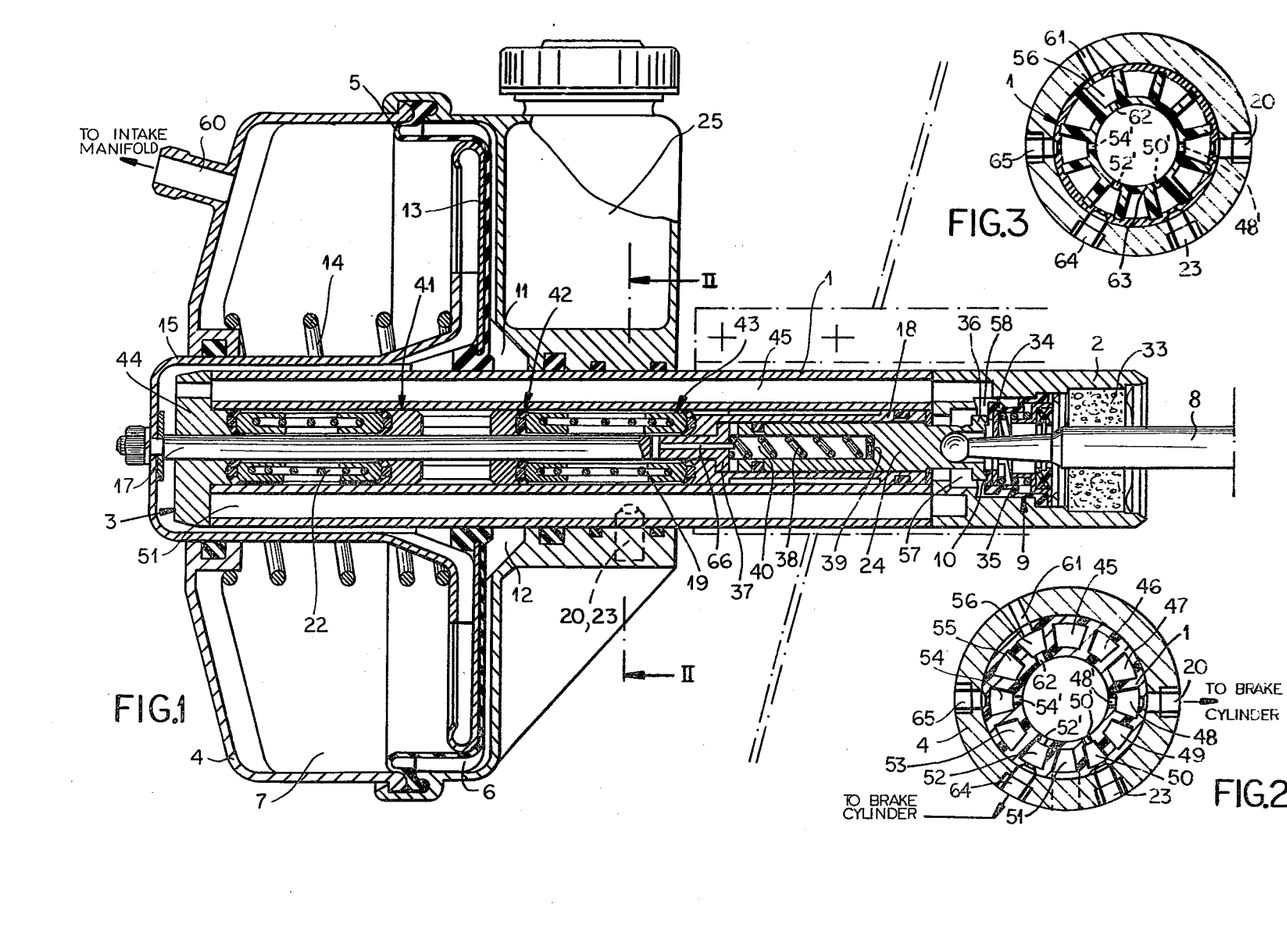
FIG. 1 is a longitudinal cross-sectional view, partially in side elevation, of a hydraulic brake assembly with a pneumatic power-assist device, according to my present invention.
FIG. 2 is a partial cross-sectional view taken along line II—II in FIG. 1.
FIG. 3 is a view similar to FIG. 2.

As illustrated in FIGS. 1 and 2, a power-assisted master cylinder assembly for use in automotive vehicles comprises, according to my present invention, a substantially cylindrical housing 1, a master brake cylinder 3 inserted in and rigid with the housing and a vacuum-operated power booster device 4 having a pair of annular chambers 6, 7 separated by a flexible web or membrane 5. The annular chambers of the booster device are concentric with and at least partially surround housing 1 and master brake cylinder 3.

As shown in FIG. 1, a valve casing 2 attached to one end of housing 1 carries an air filter 33 in which a push rod 8 is slidable, this push rod being connected at one end to a brake pedal (not shown) of an automotive vehicle and at an opposite and to an elongate cylindrical force-transmission member or piston 24 slidably mounted in an actuator piston 18 of master cylinder 3. Casing 2 houses a valve 9 comprising a flexible sleeve 34 fixed at one end to an inner surface of casing 2 and biased at an opposite end against an annular flange 36 of member 24, this biasing being implemented by a compression spring 35 disposed inside sleeve 34.

Power booster 4 includes an annular disk or plate 13 which engages membrane 5 under the action of a compression spring 14 and which is connected to a force-transmission sleeve 15. This sleeve surrounds an extremity of housing 1 opposite casing 2 and is connected to one end of a tension rod 17 traversing a substantial portion of master cylinder 3. The other end of rod 17 is formed with a flange 37 which is slidably inserted in piston 18, a spring 38 being compressed between this flange and a circular surface 39 defining an end of a cylindrical recess 40 in force-transmission member 24.

Axial motion of actuator piston 18 causes similar motion of three annular fluid-compression pistons 41, 42, 43 slidably mounted in housing 1 and concentrically surrounding tension rod 17. Pistons 42 and 43 define a first brake-fluid chamber 19, while piston 41 together with an end cap 44 of master cylinder 3 define a second brake-fluid chamber 22.

As shown in FIG. 2, housing 1 is provided with a multiplicity of axially extending conduits or cells 45–56 which serve as fluid-flow or air-flow paths, as described hereinafter. Owing to its cellular structure, housing 1 may have thin walls and may be formed from synthetic resin (FIG. 2). It may consist of a single integral body (FIG. 2) or may include a plurality of distinct parts (FIG. 3).

Conduit 45 (FIGS. 1 and 2) communicates at one end with power-booster chamber 7 via sleeve 15 and at an opposite end with an inner space 57 of casing 2 via an aperture 58. Space 57 is in turn connected to power-booster chamber 6 via an aperture 59, conduit 51 and air-flow channels 11, 12 which are connected to the conduit 51 by an aperture not visible in the drawing. Thus, in an unactuated state of the master cylinder assembly of FIGS. 1 and 2, an air-flow path extends from chamber 6 through channel 11, 12, conduit 51, casing space 57, conduit 45 and sleeve 15 to chamber 7. As indicated in FIG. 1, chamber 7 communicates with the intake manifold of an automobile engine via a stub connection 60; during engine operation and when the brake pedal is not depressed, air is drawn from both booster chambers 6 and 7.

Upon the pushing of the brake pedal and the consequent axial motion of push rod 8, sleeve 34 is axially extended under the force of spring 35 and closes valve 9, i.e. blocks communication betwen aperture 58 and space 57. Further inward axial motion of rod 8 causes flange 36 to separate itself from an inner annular surface 10 of sleeve 34, whereupon air is drawn from the atmosphere through filter 33, space 57, conduit 51 and channels 11, 12 into booster chamber 6. The pressurization of chamber 6 causes disk 13 to move against the action of spring 14, this motion being transmitted over sleeve 15 and tension rod 17 to actuator piston 18 to aid push rod 8 in the operation of the master brake cylinder.

As illustrated in FIG. 1, a brake-fluid reservoir or tank 25 is mounted on housing 1 in juxtaposition to power booster device 4. This tank is connected to conduit 56 of housing 1 by a radially extending bore 61 (see FIG. 2), conduit 56 in turn communicating with fluid-compression chambers 19 and 22 via a pair of openings 62 (see FIGS. 2 and 3) disposed in an inner cylindrical wall 63 of housing 1 proximate to pistons 41 and 43. Upon inward axial motion of pistons 41–43, openings 62 are blocked and consequently communication is temporarily interrupted between conduit 56 on the one hand and chambers 19 and 22 on the other hand.

As shown in FIG. 2, fluid-compression chambers 19 and 22 are linked to housing conduits 48, 50, 52, 54 via respective openings 48', 50', 52', 54', conduits 48, 50, 54 in turn being connected via respective fluid-flow paths 20, 23, 64, 65 to the brake cylinders at the wheels of a vehicle in which the brake assembly of FIGS. 1 and 2 is installed. Openings 48', 50', 52', 54' are disposed in inner wall 63 near piston 42 and end cap 44; the spacing of these openings from pistons 41 and 43 ensures an uninterrupted fluid-flow path from the fluid-compression chambers 19 and 22 to the brake cylinders during actuation of a power-assisted master-brake asssembly according to my present invention.

Tension rod 17 is provided with a bore or conduit 66 which communicates at one end with chamber 19 and at an opposite end with recess 40. During the actuation of master cylinder 3 by push rod 8, brake fluid is guided from chamber 19 to recess or chamber 40, thereby exerting a feedback force on rod 8 via force-transmission member 24.

Figure 4:
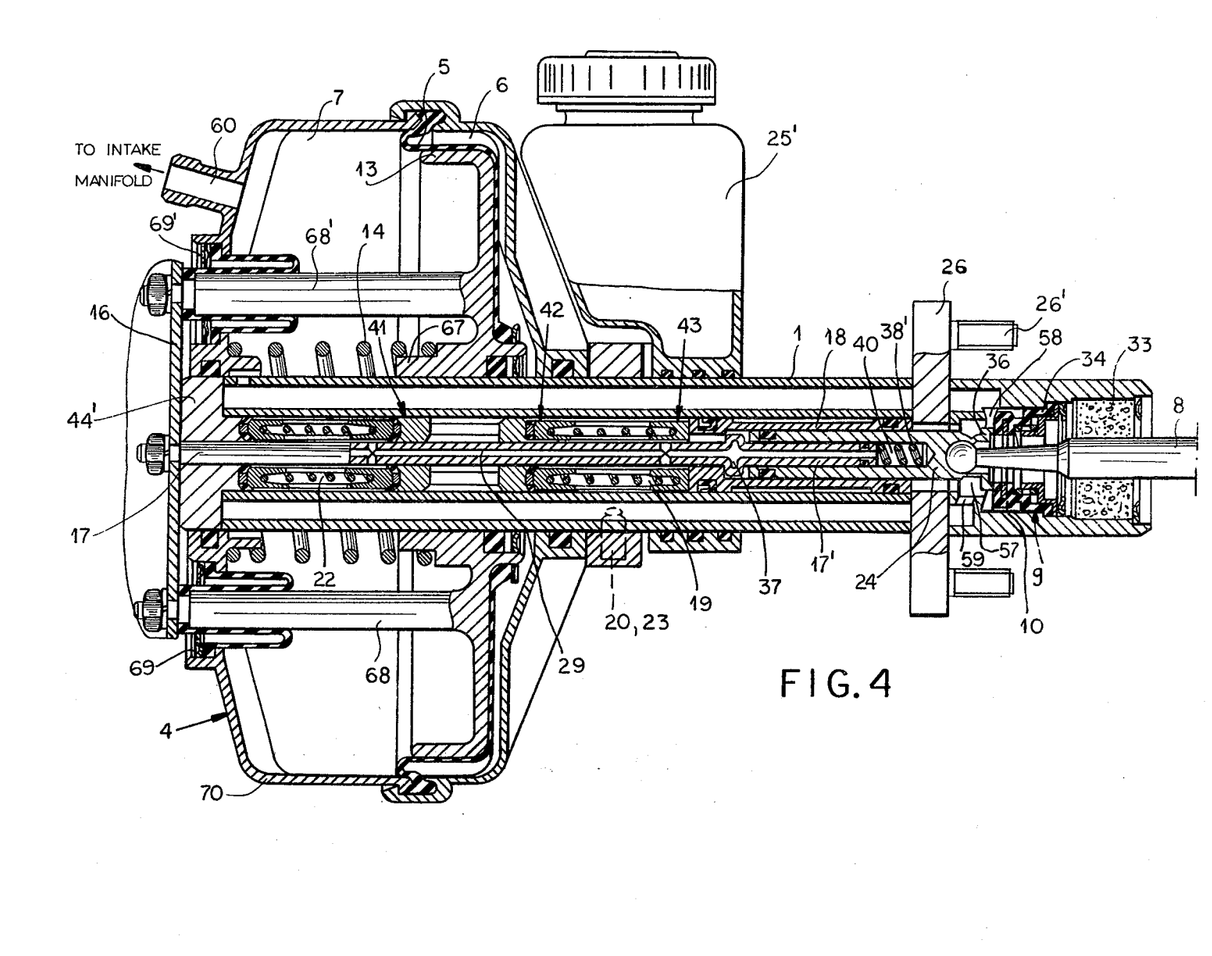
FIG. 4 is a view similar to FIG. 1, showing an alternative embodiment of a brake assembly according to my present invention.

An alternative embodiment of a power-assisted master brake cylinder assembly according to my present invention is illustrated in FIG. 4. Annular booster plate 13 is provided at its inner periphery with a guide collar 67 slidably mounted on housing 1 and is attached to tension rod 17 by means of a bracket of plate 16 extending substantially transversely to housing 1 and by means of a pair of cylindrical bar members 68, 68' extending parallel to the housing. Bars 68, 68' traverse respective openings 69, 69' in a toroidal shell 70 which defines, together with membrane 5 and the outer surface of housing 1, booster chambers 6 and 7.

As illustrated in FIG. 4, tension rod 17 may be provided with an axial extension 17' rigid with flange 37 and projecting a substantial distance into recess 40, a compressed spring 38' being disposed between an end of extension 17' and an inner surface of force-transmission member 24. Rod 17 and extension 17' are formed with a generally axial conduit communicating with fluid-compression chambers 19 and 22 and with recess 40.

Advantageously, a fluid-storage tank 25' is removably mounted on housing 1 substantially transversely to the longitudinal dimension thereof. As heretofore described with reference to FIGS. 1 and 2, reservoir or tank 25' communicates with master-cylinder pressure chambers 19 and 22 via a conduit or cell in the housing and via a pair of valves comprising openings in the inner housing wall closable upon the axial motion of pistons 41, 43. The assembly of FIG. 4 is fastenable to a vehicle frame by means of bolts 26' and a flange 26 rigid with housing 1.

Figure 5:
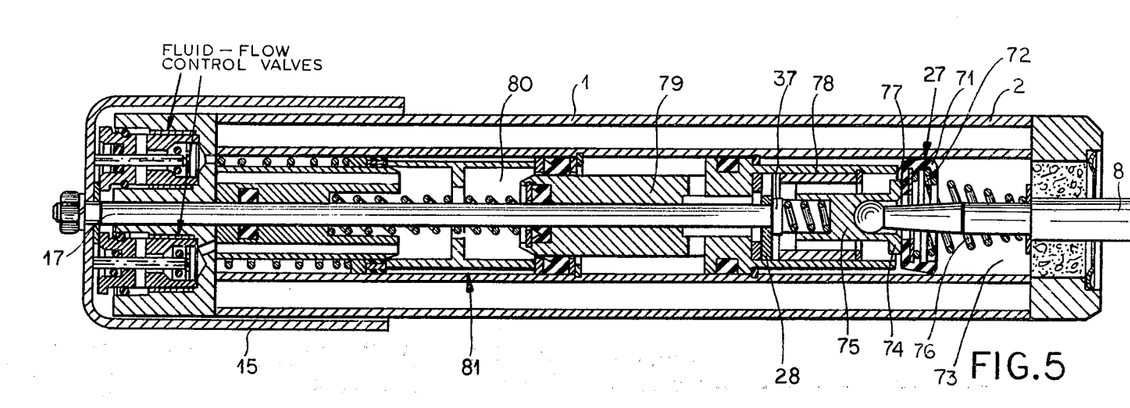
FIG. 5 is a longitudinal cross-sectional view of another brake assembly according to my present invention, a power-assist device shown in FIG. 1 or 4 being omitted.

As illustrated in FIG. 5, a power-assisted brake assembly according to my present invention may include an air-flow control valve 27 substantially in the form of an annular rubber or synthetic-resin valve member 71 having an inner groove carrying an O-ring 72 which in part serves to press the valve member against an inner surface 73 of the valve casing 2 or housing 1. Member 71 is held against an annular flange 74 of a force-transmission member 75 by a biasing spring 76. Upon an inward axial motion of push rod 8, valve member 71 travels with the same until an air-tight engagement is formed between the valve member and a rim 77 of an actuator piston 78 slidably inserted in housing 1. Piston 78 engages a fluid-compression piston 79 which extends partially into a brake-fluid chamber 80 of a master brake cylinder 81 inserted in housing 1.

As heretofore described with reference to FIG. 1, tension rod 17 connected to power-assist device 4 via sleeve 15 extends through a substantial portion of master cylinder 81 and is provided at an inner end with flange 37 facing force-transmission member 75. A brake assembly according to my present invention may, as shown in FIG. 5, include a lever 28 disposed between flange 37 and a head of piston 78 for mechanically transmitting a feedback force to push rod 8 via member 75 upon an actuation of master cylinder 81 by push rod 8 and upon the transmission of an auxiliary force from power booster 4 (see FIGS. 1 and 4) via tension rod 17.

Figure 6:
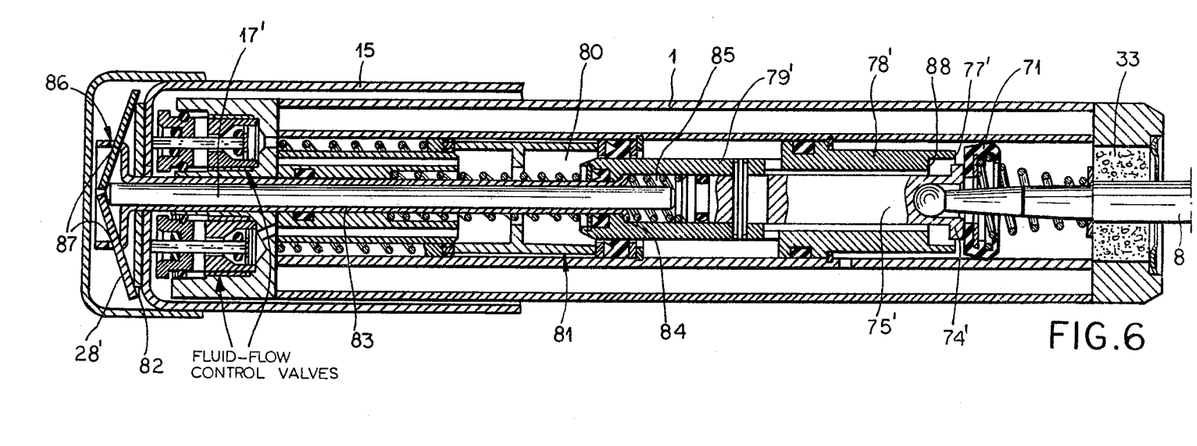
FIG. 6 is a partial cross-sectional view of yet another brake assembly according to my present invention, a power-assist device being again omitted.

As illustrated in FIG. 6, force may be mechanically fed back from the power booster to the brake pedal by means of a push rod 17' and a pair of levers 28'. The levers engage at their outer ends a shoulder or rim 82 of sleeve 15 and at their inner ends the tip of push rod 17'. This rod is inserted in a cylinder 83 having at one end a flange 84 seated in a recess 85 of a fluid-compression piston 79' similar in dimensions to piston 79 (FIG. 5) and likewise protuding partially into brake-fluid chamber 80. At an opposite end from flange 84 cylinder 83 is provided with a cup-shaped extension 86 having a pair of slots or openings 87 traversed by levers 28'.

As heretofore described with reference to FIG. 5, valve member 71 engages flange 74' of a force-transmission member 75' in a nonactuated state of master cylinder 81. Upon an inward axial motion of push rod 8 and member 75', valve member 71 engages a rim or lip 77' of an actuator piston 78' slidably inserted in housing 1, thereby closing an air-flow path between the chambers 6 and 7 of power booster 4 (see FIGS. 1-4). Further inward shifting of rod 8 and transmission member 75' separates flange 74' from valve member 71, thereby opening an air-flow path from the atmosphere through filter 33 to booster chamber 6 (FIGS. 1 and 4), and causes flange 74' to subsequently engage an inner annular shoulder 88 of piston 78', thereby forcing the same to move and push fluid-compression piston 79' into chamber 80. The pressurization of booster chamber 7 causes the shifting of sleeve 15 which thereupon engages cup-shaped extension 86. A tensile force is transmitted along cylinder 83 to aid push rod 8 and actuator piston 78' in the operation of master cylinder 81. Concomitant with the transmission of this tensile force via cylinder 83 is the transmission of a compressive force via rod 17', this compressive force arising from the action of levers 28' at one end of rod 17' and the engagement of the same and member 75' at the other end of rod 17'.

Figure 7:
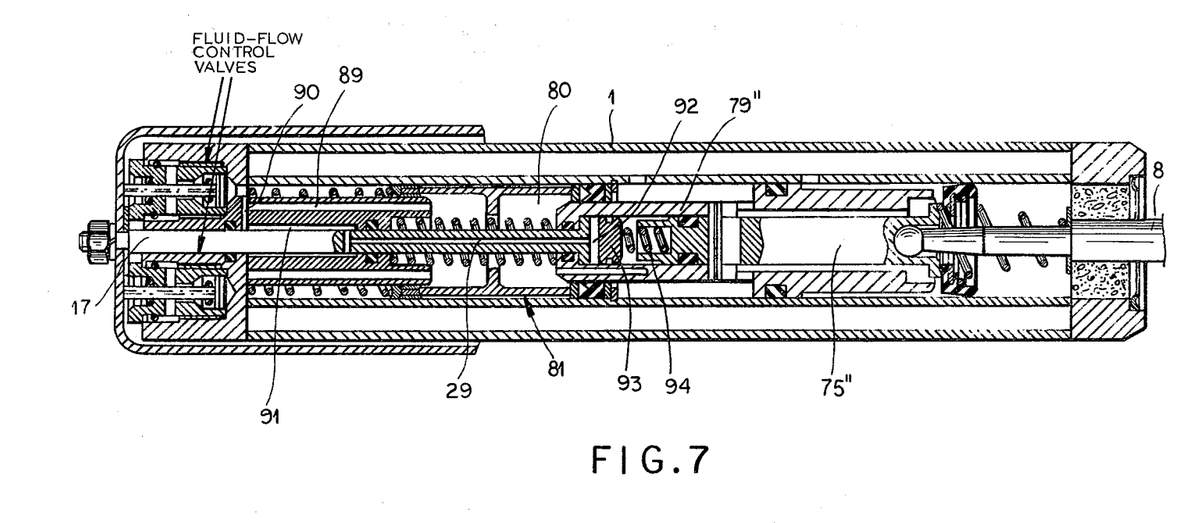
FIG. 7 is a view similar to FIGS. 5 and 6, showing another embodiment of a brake assembly according to my present invention.

The embodiment of my present invention shown in FIG. 7 is substantially identical to the brake assemblies of FIGS. 5 and 6 except that the means for feeding force back to the brake pedal is hydraulic rather than mechanical. Thus tension rod 17 is formed with a conduit 29 which communicates at one end with brake-fluid chamber 80 via a flow path comprising a bore 89, an indentation 90 and a recess 91 and which communicates at an opposite end with a chamber 92 in a fluid-compression piston 79''. Chamber 92 is defined in part by an auxiliary piston 93 slidably inserted in a recess in piston 79''. Feedback force is transmitted to a member 75'' and rod 8 at first via a spring 94 and, upon continued actuation of the master cylinder 81, via a direct contact between piston 93 and transmission member 75''. It is to be noted that each piston pair 78, 79 and 78', 79' and 78'', 79'' may be formed as an integral body.

Figures 8, 9:
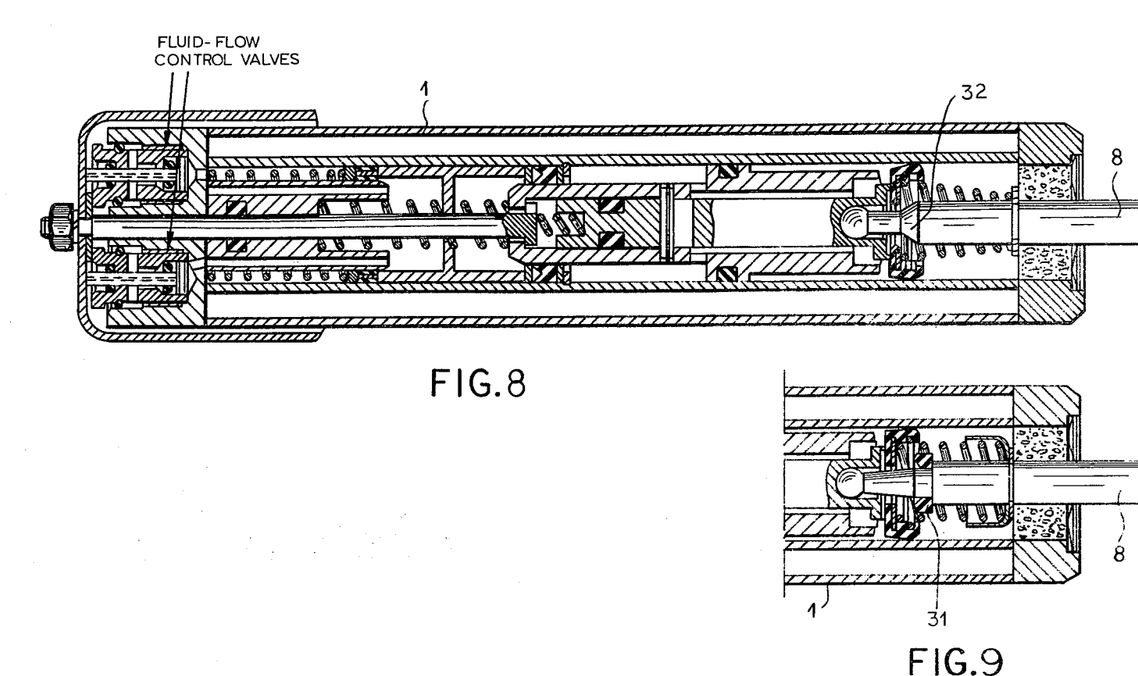
FIG. 8 is a view similar to FIGS. 5–7, showing yet another brake assembly according to my present invention.
FIG. 9 is a partial cross-sectional view of another embodiment of a power-assist brake assembly according to my present invention, showing a modification of the assembly of FIG. 8.

As illustrated in FIGS. 8 and 9, push rod 8 may be formed with a beveled shoulder 32 or with an annular additional valve member 31 for blocking the flow of air to booster chamber 6 in a brake assembly with hydraulically implemented force feedback in the event that a hydraulic circuit extending to one of the wheels is broken.

I claim:
1. Hydraulic brake assembly with pneumatic power assist for use in a motor vehicle, said assembly comprising:
a substantially cylindrical elongated housing;
fastening means for attaching said housing to the frame of said vehicle;
tandem master brake cylinders aligned with one another, rigid with and surrounded by said housing;
actuator means including a push rod operatively linked at one end to a brake pedal of said vehicle and at an opposite end to pistons of said master cylinder for operating same;
power-booster means operatively connected to said master cylinder and to the intake manifold of the engine of said vehicle for assisting, with suction power supplied by said manifold, said push rod in the operation of said master cylinders, said power-booster means including a pair of annular chambers separated by a membrane and concentrically surrounding said housing and said master cylinders, and a tension rod axially traversing a substantial portion of said master cylinders and linked to said membrane power-booster means for transmitting a tensile force to said pistons to aid said push rod in the actuation of said master cylinders, said housing axially traversing said annular chambers and said membrane;
reservoir means attached to said housing between ends thereof for storing brake fluid for charging said master cylinders;
hydraulic-circuit means extending from said master cylinders to wheel brake cylinders for guiding brake fluid upon the operation of said master cylinders;
a valve casing rigid with said housing;
first valve means mounted in said casing and operatively connected to said actuator means and to said power-booster means for controlling the operation thereof at least partially in response to axial motion of said push rod, said first valve means being connected to said power-booster means by at least one channel running through said housing; and
second valve means in said hydraulic-circuit means responsive to the axial motion of said push rod for closing a circuit path between said reservoir means and said master cylinder and for opening another path between same and said brake cylinders upon an inward axial shift of said push rod.

2. The assembly defined in claim 1 wherein said master cylinder includes at least one brake-fluid chamber defined in part by a fluid-compression piston disposed between said actuator piston and an end of said master cylinder opposite said casing, said brake-fluid chamber communicating with said hydraulic-circuit means, further comprising feedback means operatively engaging said actuator means for feeding force back to said pedal upon operation of said master cylinder.

3. The assembly defined in claim 2 wherein said actuator means includes a compression member engaging said push rod and slidably mounted in said actuator piston, said feedback means including a conduit extending in said tension rod from said brake-fluid chamber to an additional chamber defined in part by a recess in said compression member at an end thereof opposite said push rod.

4. The assembly defined in claim 3 wherein said master cylinder includes a plurality of brake-fluid chambers disposed in an axial array and defined by respective pistons, said conduit communicating with each brake-fluid chamber and with said additional chamber.

5. The assembly defined in claim 2 wherein said feedback means includes a mechanical force transmitter.

6. The assembly defined in claim 5 wherein said transmitter is in the form of a lever engaging said tension rod.

7. The assembly defined in claim 5 wherein said transmitter is disposed in said housing.

8. The assembly defined in claim 1 wherein said reservoir means includes a storage tank juxtaposed to said annular chambers.

9. The assembly defined in claim 8 wherein said tank is oriented transversely to said housing.

10. The assembly defined in claim 8 wherein said tank is removably fixed to said housing.

11. The assembly defined in claim 1 wherein said housing is formed with axially extending elongate conduits, said hydraulic circuit means including a plurality of said elongate conduits, said power-booster means being connected to said first valve means by at least one of said elongate conduits.

12. The assembly defined in claim 11 wherein said housing is formed from a plurality of separate parts.

13. The assembly defined in claim 11 wherein said housing is formed from a synthetic resin.

14. The assembly defined in claim 1 wherein said first valve means includes an annular valve member carried with said push rod.

15. The assembly defined in claim 1 wherein said power-booster means includes a sleeve surrounding an end of said housing opposite said casing, said sleeve being connected to said tension rod.

16. The assembly defined in claim 1 wherein said master cylinder includes at an extremity proximate to said casing an actuator piston operatively connected at an outer end to said push rod and engageable at an inner end with a compression rod axially traversing a substantial portion of said master cylinder and linked via a lever outside said housing to said power-booster means for feeding back a force to said piston upon the actuation of said master cylinder by said push rod.

* * * * *